US006504278B1

(12) United States Patent
Bald et al.

(10) Patent No.: US 6,504,278 B1
(45) Date of Patent: Jan. 7, 2003

(54) REGULATING DEVICE FOR ADJUSTING THE STATIC MOMENT RESULTING FROM UNBALANCED MASS VIBRATION GENERATORS

(75) Inventors: Hubert Bald, Bad Berleburg; Brigitte Ludwig, Hurth Fischenich, both of (DE)

(73) Assignee: Gedib Ingenieurburo und Innovationsberatung GmbH, Bad Berleburg (DE)

( * ) Notice: Subject to any disclaimer, the term of this patent is extended or adjusted under 35 U.S.C. 154(b) by 0 days.

(21) Appl. No.: 09/674,934

(22) PCT Filed: May 4, 1999

(86) PCT No.: PCT/DE99/01348

§ 371 (c)(1), (2), (4) Date: Nov. 8, 2000

(87) PCT Pub. No.: WO99/58258

PCT Pub. Date: Nov. 18, 1999

(30) Foreign Application Priority Data

May 8, 1998 (DE) ........................................ 198 20 670

(51) Int. Cl.[7] ......................... H02K 7/06; H02K 33/00; B06B 1/16

(52) U.S. Cl. ......................................... 310/81; 318/114

(58) Field of Search ............................ 310/81; 318/128, 318/689, 34, 114, 623, 460, 649; 702/41, 56; 74/61, 87; 248/550, 559, 636, 562; 188/378, 379, 380

(56) References Cited

U.S. PATENT DOCUMENTS

| | | | | | |
|---|---|---|---|---|---|
| 4,289,042 | A | * | 9/1981 | Brown | 74/61 |
| 4,483,425 | A | * | 11/1984 | Newman | 188/378 |
| 4,929,874 | A | * | 5/1990 | Mizuno et al. | 318/128 |
| 5,369,348 | A | * | 11/1994 | Gennesseaux | 318/623 |
| 5,825,663 | A | * | 10/1998 | Barba et al. | 74/61 |
| 5,903,077 | A | * | 5/1999 | Garnjost et al. | 310/81 |
| 6,212,445 | B1 | * | 4/2001 | Barba et al. | 700/280 |
| 6,229,234 | B1 | * | 5/2001 | Lambert et al. | 310/81 |

FOREIGN PATENT DOCUMENTS

| | | | |
|---|---|---|---|
| DE | 4439 170 | A1 | 5/1956 |
| EP | 0 506 722 | B1 | 12/1990 |
| EP | 0 473 449 | B1 | 12/1994 |
| EP | 0 524 056 | B1 | 4/1995 |
| EP | 0515 305 | B1 | 11/1995 |
| EP | 0840 191 | A1 | 5/1998 |
| FR | 2606 110 | A1 | 5/1988 |
| WO | WO 94/01225 | | 1/1994 |
| WO | WO 97/19765 | | 6/1997 |

* cited by examiner

*Primary Examiner*—Tran Nguyen
(74) *Attorney, Agent, or Firm*—Alix, Yale & Ristas, LLP

(57) ABSTRACT

The invention relates to a regulating device for an unbalanced mass vibration generator, comprising at least two pairs of partial unbalanced mass bodies that can be driven around an allocated axis whose vectorially added partial centrifugal force vectors form the resulting centrifugal force vector. Adjustment is carried out between a resulting minimal unbalance moment (amplitude of oscillation=minimal) and a resulting maximal unbalance moment (amplitude of oscillation=maximal) without any intermediate positions, whereby both allocated limiting phase angles are regulated using two stops. The regulating device also enables acceleration and stopping of the vibrator with a regulated minimal unbalance moment. The regulating device selectively utilizes one or two drive motors for regulating the phase angle. Due to the utilization of stops in adjusting the phase angle, it is no longer necessary to use complicated control means and a compact structure is made possible. The invention is preferably used in construction and construction material machines.

15 Claims, 5 Drawing Sheets

424
403a
A
401
403b
426
434
402
452
454
450
410
466
456
436'
436
432
404
406
408
422
M4
438
400
442
444
440
446
A
427
458

REGULATING DEVICE FOR ADJUSTING THE STATIC MOMENT RESULTING FROM UNBALANCED MASS VIBRATION GENERATORS

CROSS REFERENCE TO RELATED APPLICATION

This is the United States national phase of International Application No. PCT/DE 99/01348, filed May 4, 1999.

BACKGROUND OF THE INVENTION

The invention relates to an adjusting device for adjusting the resultant static moment of unbalanced-mass vibrators for the generation of directed oscillations, said static moment being generated by at least two pairs of unbalanced-mass part-bodies adjustable relative to one another over a relative adjustment angle β. A particular generic type of adjusting devices for unbalanced-mass vibrators for the generation of directed oscillations is described in the document EP 0 506 722 B1 to be included in the general prior art. For the sake of simplification, the terms used in said publication, namely the unbalanced-mass part-bodies and the centrifugal part-forces (or centrifugal part-force vectors), assigned to them, the unbalanced-mass part-bodies of one type and the other and the "pair" of unbalanced-mass part-bodies, have been adopted in the subsequent description of the present invention. In accordance with the publication mentioned, the relative adjustment angle β (subsequently called phase angle β) is also defined below in such a way that the value β=180° corresponds to a zero amplitude of oscillation and the value β=0° corresponds to a maximum amplitude of oscillation.

The phase angle β is theoretically defined between the centrifugal part-force vectors of the individual unbalanced-mass part-bodies of one type and the other of a "pair" of unbalanced-mass part-bodies. In practice, the phase angle β may also be defined between features (for example, geometric features) of the unbalanced-mass part-bodies of a pair, insofar as the position of the mass center of gravity of the eccentric mass is known. The identification "MR" is used for the reaction torques "MR" which, in the case of a phase angle β≠180°, occur twice as alternating moments during each unbalanced-mass revolution through the angle of rotation $\mu=2\pi$ on the shafts of the unbalanced-mass part-bodies [these alternating moments have a sinusoidal profile with two minimum and two maximum values per revolution of the unbalanced-mass part-body].

The average reaction torques which act in only one direction and which can be calculated by integrating MR($\mu$) against the angle of rotation $\mu=2\pi$ and by subsequently dividing the integration value by 2π are designated here by "MRQ". As a person skilled in the art may gather, for example, from the document EP 0 506 722 B1, in the case of a set phase angle 0°<β<180°, these average reaction torques MRQ [which themselves then represent a function of the phase angle β, hence: MRQ(β)] act on the unbalanced-mass part-bodies of a pair in such a way that the reaction torques MRQ of one type seek to accelerate the rotation of the unbalanced-mass part-bodies of one type and that the reaction torques MRQ of the other type seek to decelerate the rotation of the unbalanced-mass part-bodies of the other type. In an unbalanced-mass vibrator according to FIG. 1 of the description of the invention, the result of this mode of operation, insofar as said vibrator were to operate in idling mode with a phase angle of, for example, β=90°, would be that the motor M2 would have to operate in a motive way and the motor M1 in a generative way, both motors (taking into account the output due to bearing friction) converting part of their power as apparent power. The operation of vibrator motors working with apparent powers is also clearly illustrated in FIG. 2 of the document WO 97/19765 likewise included in the general prior art (it should be noted that this has a different definition of the phase angle β such that, here, β=0° is equated to an amplitude of oscillation=zero). It is pointed out at this juncture that a person skilled in the art is also aware of other designations, such as, for example, "centrifugal moment" or "unbalance moment", for the designation "static moment".

Furthermore, the present invention relates, in particular, to that generic type of piledriving vibrators which are adjustable in terms of their static moment and operate at high working rotary frequencies and which are designed for a particular operating mode such that, when they are used for work, the excitation of resonant frequencies $f_R$ lying below the working rotary frequency $f_o$ of the vibrator is to be avoided. In the directional vibrators which come under consideration for this operating mode, it is possible, by means of their control devices, during the rotation of the vibrator (in addition to the setting of any desired resultant static moments) to set selectively two particular resultant static moments: the setting of a "minimum position" with a minimum resultant static moment for the generation of an amplitude of oscillation equal to zero and the setting of a "maximum position" with a maximum resultant static moment for the generation of a maximum amplitude of oscillation. The particular operating mode works as follows: adjustment of the phase angle to the minimum position when the vibrator is at a standstill. Running up of the vibrator in the set minimum position to the working rotary frequency $f_o$. Adjustment of the phase angle to the maximum position and execution of the vibration work. Adjustment of the phase angle to the minimum position. Reduction of the rotary frequency of the vibrator from the working rotary frequency to zero, with the minimum position being maintained. The particular operating mode last described is also to be referred to below by the designation "resonance avoidance operating mode".

Two generic types of adjustable vibrators are known for executing an operating mode such as that described above. One generic type, which is described, for example, in EP 0 473 449 B1 or in EP 524 056 B1, works, for the purpose of adjusting the phase angle, with a mechanical variable-ratio gear unit, by means of which there is always a torque-transmitting connection of the unbalanced-mass part-bodies of one type to the unbalanced-mass part-bodies of the other type via the variable-ratio gear unit. In the other generic type of "motively adjustable vibrators", the adjustment of the phase angle is brought about without a variable-ratio gear unit, specifically using adjusting motors which may at the same time also be working motors. The present invention is to be attributed to the last-mentioned generic type, since, in it, the adjustment of the phase angle is carried out, with drive motors also being included.

Insofar as the motively adjustable vibrators are intended, with the aid of a closed control loop and an angle measuring device, to make it possible to set and hold the phase angle continuously at any predeterminable value between β=180° and β=0° (as is provided, for example, in the case of EP 515 305 B1, EP 0 506 722 B1 and WO 97/19765), they are indeed suitable for executing the "resonance avoidance operating mode", but they have the disadvantage that they are highly cost-intensive and that, in practice, it is not yet possible in a satisfactory way to regulate the phase angle in the range of about −90°<β<+90°. This is connected with the profile of the function of the reaction torque MRQ(β) or of the dependent necessary motor torque MD(β) in dependence bn the phase angle β (with a positive curve gradient in an angular range of about 0°<β<90° and with a negative curve gradient in the angular range of about 90°<β<180°), as may be gathered, for example, from FIG. 2 of WO 97/19765. Another disadvantage is that, when the continuous regulation of the phase angle β is used even when the intention is to work only in the maximum position (point E or E' in FIG. 2 of WO 97/19765), during the run through the entire range of adjustment of the phase angle β the motors have to be loaded with far higher torques than is necessary for the maximum position.

If two further solutions are considered, which are disclosed by DE 44 39 170 A1 and WO 94/01225 and in which the adjustment of the phase angle β is likewise to be possible, with drive motors being included, and in which it is to be possible to set a phase angle without a complicated measuring and regulating device, it can be established, in general terms, that the adjusting devices for adjusting the phase angle β, which are provided there and operate without a closed control loop, are, of course, all the more unsuitable for setting a phase angle β in the range of about −90°<β<+90°. Moreover, these solutions lack the capacity for executing a "resonance avoidance operating mode". A closer look also makes it possible to establish the following:

The vibrator presented in DE 44 39 170 A1 relates to a quite specific type of generation of a directed resultant centrifugal force, specifically using at least 3 pairs of unbalanced-mass part-bodies with at least 6 individual unbalanced-mass part-bodies. This configuration results in a series of still unknown physical effects in the case of a vibrator of adjustable phase angle (as shown in DE 44 39 170 A1) For example, the behavior of this vibrator, "as regards the question of whether and, if so, with what effects reaction torques occur" (column 4, lines 36–38). How a regulation of the phase angle by means of such effects, particularly also in the range −90°<β<+90°, could be completed is left open in the description. The statements on the object of the invention (column 4, lines 46+) say, in general terms, that the use of hydraulic motors as drive motors and servomotors is to take place only in conjunction with controllers, so that any predetermined values for the relative adjustment angle can be set (this, however, presupposes the existence of a measuring system). In the event that the vibrator were to be operated only by regulation, using a closed control loop, a vibrator according to DE 44 39 170 A1 would have to be included in the last-described generic type of vibrators which is also capable of executing the "resonance avoidance operating mode".

However, as expressed in the statements in column 8, lines 49 to 56, a control of the phase angle (open control circuit) is also to be possible. In that case this control, to which the control line 80 issuing between the series-connected motors 40 and 42 also refers, would have to function in the particular way described in the publication DE 43 01 368 (corresponding to WO 94/01225) mentioned there. This particular way also includes, inter alia, the fact that an adjustment of the phase angle β is only possible in the range 90°<β<180° (according to the angle definition of the present invention).

A stop for limiting the phase angle β for the purpose of setting a minimum amplitude not to be undershot is provided, so that, if the motor regulation fails, a further variation in the phase angle can be prevented by means of constraints. This is carried out because, in the event of a set genuine zero amplitude, the rolling bearings of all the unbalanced-mass shafts would be damaged. However, this stop does not serve for maintaining the phase angle β as a minimum position along the lines of the "resonance avoidance operating mode" when the vibrator is run up from a standstill to the working rotary frequency. A stop is likewise provided for setting the maximum amplitude, but only in an emergency when the normal regulating device for the phase angle β fails. It should also be noted that this document has a different definition of the phase angle β such that β=0° would have to be equated to an amplitude of oscillation= zero.

The publication WO 94/01225 may be considered as the nearest prior art: it should be noted that, in this document, contrary to the definition of the present invention, the phase angle β is fixed such that β=0° corresponds to a zero amplitude. As may be gathered, for example, from FIG. 1, in the vibrator described there each unbalanced-mass part-body is to be driven by its own motor, in each case two hydraulic motors which belong to different unbalanced-mass part-bodies being connected in series. A very special activation of the motors (with an open control circuit), which is suitable only for a series connection, comes under consideration for the purpose of varying the phase angle. In this case, however, simply for safety's sake, the gearwheels connected to the unbalanced-mass part-bodies 101 and 102 and meshing with one another are to come into operation in the event that the synchronization to be carried out in principle by the motors is disrupted by other disruptive forces. A stop 228/213 shown in FIGS. 2 and 3 is to serve, in particular, for ensuring that a phase angle of β=90° is not exceeded. This limitation of the phase angle is necessary, here, as a safety measure, because regulation with a closed control loop is not provided for this vibrator, and because the range of a phase angle β0°<β<90° (according to the angle definition of the present invention) is, here, a range which cannot be controlled and is therefore ruled out [page 7, lines 1 to 21; page 11, lines 9 to 21].

For this reason, this design must also take into account the disadvantage that, even in the case of a phase angle of β=90°, the desired maximum resultant static moment must be achieved, thus presupposing the use of greater unbalanced masses and leading to unnecessarily high bearing forces. Another disadvantage of the vibrator shown here is the extremely asymmetric load on the motors. In the case of a stop phase angle of β=90°, taking into account the "sum pressure", the first motors are subjected to more than two and a half times the load of the second motors. In this case, the "sum pressure" is the sum of the input pressure and output pressure of the motor, this sum being critical for the service life of the motors.

A further disadvantage is the fact that an unequivocal relationship between the adjusting torques of the servomotors and the relative adjustment angles β set as a result is afforded only when the vibrator oscillates at a uniform rotary frequency, with a constant useful power being transmitted at the same time. Insofar as the amount of one of the last-mentioned variables changes in an unpredetermined way, as may occur when piledriving vibrators are used, the use of regulation is necessary for setting or maintaining a predetermined relative adjustment angle β. That is to say, in this case, a feedback of the actual position of the rotary angles of the unbalanced-mass part-bodies is still necessary in order to set and hold the relative adjustment angle β at a predetermined value (as a result of which, this vibrator would again have to be included in the last-described generic type in which any predeterminable phase angle β can be set by means of a closed control loop.). As regards the vibrator according to the present invention, however, it is demanded that the intended mode of operation be capable of being carried out, even in the case of changed values for the rotary frequency and for the useful work converted.

SUMMARY THE INVENTION

The object of the present invention is to improve the abovementioned state of the art of vibrators with motive angle adjustment, so that, in the case of vibrators of different design, an adjustment of the static moment between a minimum position and a maximum position can be implemented more simply and more cost-effectively, while it is also to be possible to execute the "resonance avoidance operating mode".

The solution for achieving the object is defined by the independent patent claims 1 and 7, patent claim 7 being concerned with that special design variant of the invention in which two hydraulic motors hydraulically connected in series are involved in the adjustment of the phase angle, the phase angle being capable of being set only in the range $+90°<\beta<+180°$. These two claims are based on the common principle that the adjustment of the phase angle β from a minimum position to a maximum position is brought about by the action of cutting in an adjusting braking torque and/or adjusting acceleration torque which acts on the unbalanced-mass part-bodies and as a result of the effect of which the unbalanced-mass part-bodies of different type are rotated relative to one another in an uninterrupted adjustment movement, until the adjustment movement is necessarily terminated as a result of the contacting of two stop faces of a stop and the maximum position is consequently set. Further advantageous developments of the invention are described in the subclaims.

Particular advantages in the use of the invention are also exhibited with regard to the following features: the outlay is reduced, in particular, because a closed control loop is dispensed with. A reduction in the maximum motor load is achieved, with the result that motors having smaller dimensions can be employed. The problem of the regulatability of the phase angle in the range $-90°<\beta<+90°$ is avoided. An automatic operating mode of the vibrator, irrespective of the set working rotary frequency and of the useful power transmitted, can be ensured, specifically without the use of a closed control loop for the phase angle β. The adjustment from a minimum position to a maximum position (and vice versa) can be carried out extremely quickly. Where hydraulically operated motors are concerned, open and closed circulation may be employed. If hydraulic motors not connected in series are used, the provision of a special energy source for carrying out the angle adjustment may be dispensed with.

The invention is explained in more detail, using FIGS. 1 to 4, by means of four examples of vibrators according to the invention with hydraulically operated motors, FIGS. 1 to 3 each containing two part-drawings for illustrating the different switching states of the hydraulic circuit prior to the adjustment and after the adjustment of the resultant static moment from a minimum position to a maximum position. Of these figures:

BRIEF DESCRIPTION OF THE DRAWINGS

FIG. 4*b* reproduces on a reduced scale a sectional line marked by A—A in FIG. 4*a*.

DESCRIPTION OF THE PREFERRED EMBODIMENTS

Figure 1A:
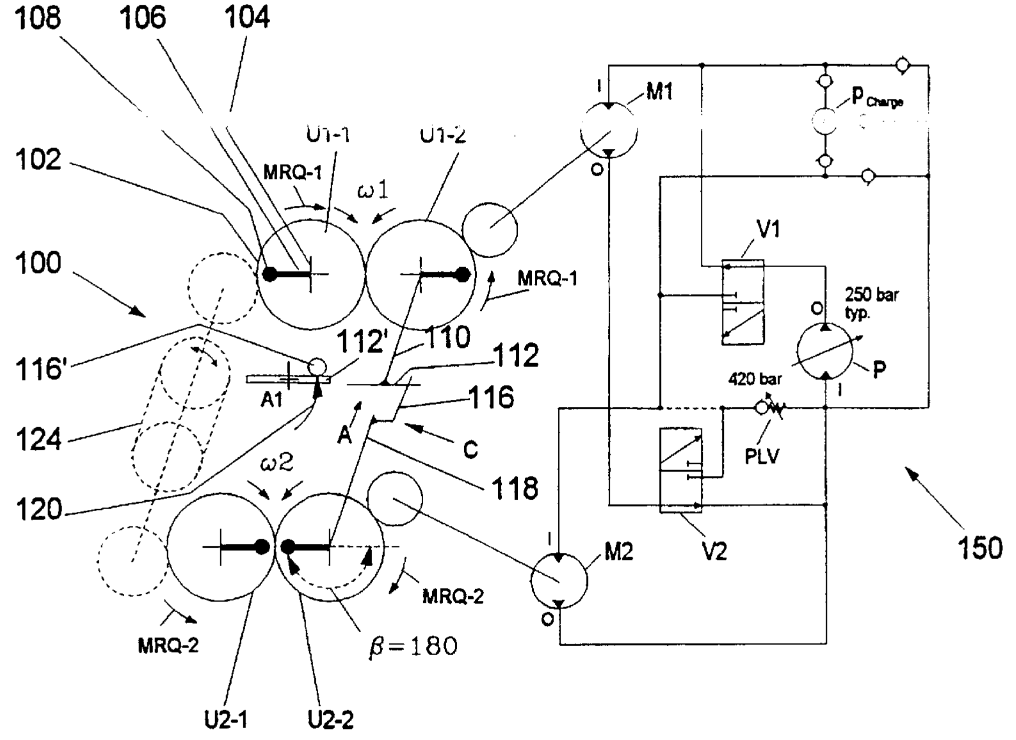
FIGS. 1*a* and 1*b* show a diagram of an exemplary embodiment with a pump and two motors, different motors being subjected to power during the operation of the vibrator with different static moments.

Some remarks are made below, which are intended to make it even easier to understand the essence of the invention, as regards the function of the adjustment of the phase angle β:

The invention represents the result of the notion that, at least for use as piledriving vibrators, a solution which is simpler and more cost-effective, as compared with the prior art, is obtained by dispensing with the possibility of setting any predeterminable phase angle β and being restricted to the possibility of setting a minimum position and a maximum position, whereby more than 90% of the objects set in practice can be fulfilled. However, the simpler solution must at the same time make it possible to execute the "resonance avoidance operating mode", since, to be precise, it has been shown that adjustable vibrators are used predominantly on account of the last-mentioned property.

The adjustment of the phase angle β is obstructed, above all, by the phenomenon of the reaction torques which take effect in different ways on the unbalanced-mass part-bodies of different types. The effect of the average reaction torques MRQ or the profile of the motor torques ΔMD to be applied to the unbalanced-mass part-bodies as a function of the phase angle β in order to compensate the reaction torques MRQ is illustrated clearly in FIG. 2 of WO 97/19765. Here, curves KA and KB represent the motor torques ΔMD which are to be applied by the motors when the respective phase angle β is set and maintained as a result of the action of a closed control loop. In order to make it easier to interpret the graph in FIG. 2 so as to explain the present invention in terms of the special case where four unbalanced-mass part-bodies are arranged on their own four unbalanced-mass shafts, the following assumptions are made: in adaption to the different definition of the phase angle β in the present invention, it is to be assumed, in FIG. 2, that the indications of special positions of the phase angle are changed as follows: 0°=−180°; 90°=−90°; 180°=0°; 270°=+90°; 360°=+180°. It is also assumed that the motor torques ΔMD are to be investigated only with regard to the special case of the idling vibrator. In this case, curve KA runs through the point K (instead of E) and curve KB runs through the point K' (instead of E'), because the segments E–K and E'–K' represent the proportionate motor torques for executing the (now lapsed) useful work. As a result of this imaginary change, the position of the points M and N is displaced, the maximum of curve KA is at 90° and the minimum of curve KB is likewise at 90°. For example, according to the new definition, curve KB would correspond, in the range 0° to 180°, to a curve which would be brought about by a superposition of the (straight) curve K'-D' and the curve B'-H'-A'.

The angular position of a minimum position of a vibrator according to the present invention is at 180° (new definition). In the assumed case where, in the present invention too, a setting of any desired predeterminable phase angle β, using a closed control loop, would be possible, and where the angular range would be run through from β=180° (minimum position) slowly and continuously to β=0° (maximum position), the motor torques ΔMD would have to assume a minimum and a maximum in each case at β=90°. It is important to note that a predetermined phase angle can be maintained only when the motor torques ΔMD identified by both curves are set on the motors. If, contrary to this condition, in the angular range 90°<β<180°, for example, the torque of the motor of curve KB has a correct value in respect of a predetermined value of the phase angle β, but the (negative) torque of the motor of curve KA has a higher value than the value correctly required, then a phase angle β corresponding to the real torque of the motor of curve KB is set and the excess (negative) torque of the motor of curve KA is converted into a reduction in the rotary frequency of the entire vibrator. It can be seen, even from this example, that the regulation of the phase angle with the aid of a closed control loop in the angular range 90°<β<180° is not simple. Regulation in the angular range −90°<β<+90° may present problems, and because of this instances can be found in practice which are restricted to the angular range 90°<β<180° for the sake of a reliable control of the phase angle β in spite of the use of a closed control loop.

It can also be seen from FIG. 2, in the graph showing curve KB, that, when a closed control loop is used and when the angular range 0°≦β≦180° is run through (slowly) or when there is a change from the minimum position to the maximum position and a given rotary frequency is maintained, an adjusting energy $E_A=E_O+E_F$ has to be applied. The proportionate adjusting energy $E_O$ corresponds to the area below curve KB minus the area of the rectangle A'-B'-K'-D', the last-mentioned area representing the bearing friction energy $E_F$. With knowledge of the formula for curve KB, the amount of the proportionate adjusting energy $E_O$ can be determined as: $E_O=M_{Res}{}^2 * \omega^2/2$ m (with m as the oscillating mass). This is at the same time also the formula for the maximum kinetic energy of the oscillating mass m at a maximum amplitude of oscillation. This cannot even be any different, because, during the continuous adjustment of the phase angle β, the kinetic energy of the oscillating masses must also increase continuously. It may be gathered from this situation that, even if the phase angle is adjusted from the minimum position to the maximum position in any other way, an adjusting energy $E_A$ has to be supplied.

Whereas in the prior art, with the use of a closed control loop being assumed, the adjusting energy $E_A$ is supplied automatically in the necessary amount as a result of the action of the control loop (even in the case of a constantly regulated working rotary frequency), this takes place in a different way in the present invention, this subsequently being explained with regard to the case "where the adjustment of the phase angle β from a minimum position to a maximum position is brought about by the cutting in of an adjusting braking torque acting on the unbalanced-mass part-bodies of one type" (claim 1): it is assumed that an adjusting device is used, such as is described by FIG. 2 of the present invention. It is assumed here, for the sake of simplicity, that, after the working rotary frequency has been reached, with the minimum position having been set, a change in position of the valve V4 is carried out (in FIG. 2*b,* in which the connection from point 270 to point 272 will now be nonexistent), until the maximum position is safely reached. As a result of this switching operation, the motor M1 is braked with a braking moment proportional to the pressure 420 bar. However, the unbalanced-mass part-bodies U2-1 and U2-2 continue to run at a higher rotary frequency than that of the unbalanced-mass part-bodies U1-1 and U1-2 and, together with the parts rotating synchronously with them, contain excess kinetic energy, as compared with the unbalanced-mass part-bodies U1-1 and U1-2. This excess kinetic energy is consumed for the most part as a result of the adjustment of the phase angle from the minimum position to the maximum position, that is to say for conversion into the adjusting energy $E_A$.

If the excess kinetic energy accumulated up to the end of the braking operation is defined by ΔE, then, for successfully carrying out the adjustment, the following must apply: $\Delta E>E_A$. However, insofar as the value of ΔE is lower than the value of $E_A$ (for example, only 200 bar instead of 420 bar), adjustment does not take place and, after initial partial adjustment, the phase angle falls back to the minimum position again. In this assumed example, therefore, the entire adjusting energy $E_A$ required for adjustment is obtained from the original kinetic energy of the system of the parts rotating together with U2-1 and U2-2. This alone would give grounds for the necessity, in this example, of associating the adjustment of the phase angle from the minimum position into the maximum position with a reduction in the rotary frequency of the vibrator. When there is the connection from point 270 to point 272 in the example described, part of the energy extracted, during the braking of the motor M1, from the system of the parts rotating together with it is supplied again to the adjustment operation for the purpose of conversion into the adjusting energy $E_A$. In this version, too, however, for the purpose of initiating the adjustment a specific energy must initially be extracted from the system of the parts rotating with the motor M1.

The example described also shows the following situation: insofar as a constant brake pressure is generated at the output of the motor M1 from the start of adjustment to its end, said brake pressure also being in a specific ratio to the generated excess kinetic energy of the system of the parts rotating together with the motor M2, a lower pressure than is necessary is at all events required in order to drive the nonbraked motor in the case of adjustment by the use of a closed control loop. This means, in the graph in FIG. 2 of WO 97/19765, that the maximum pressure Δp of curve KB does not have to be reached. This effect may be utilized advantageously to give the motors smaller dimensions.

As regards the case, which occurs in practice, where a useful power is transmitted by the vibrator, it must be remembered that the adjusting energy $E_A$ must be greater than when the vibrator is idling. This makes it necessary, according to the invention, in the example described, for the energy converted during the braking of the motor M1 to be higher. In order to take this fact into account, the braking energy is metered by means of a suitable empirically found combination of braking time and braking pressure, such that all the objects which arise in practice are consequently taken into account. This requirement alone makes it necessary to employ a stop defining the maximum position.

It can also be seen that the problem of controlling the angular range −90°<β<+90°, this problem arising when the phase angle β is adjusted, using a closed control loop, is avoided in the present invention. This is because this range is run through under the effect of the drive of the kinetic energy of the adjustment movement, said kinetic energy having been introduced into the unbalanced-mass part-bodies of one and/or the other type even before the angular range −90°<β<+90° has been run through. The relevant angular range which presents problems is simply run through "blind", until the stop for the maximum position is reached.

The maximum stop has a first importance in that the maximum position is defined thereby. Its second importance is that, by one of the means mentioned in claim 3 under feature b) being used for maintaining the maximum position, the unbalanced-mass part-bodies of different type of a pair can act virtually as a single composite unbalanced-mass body. This has a beneficial effect in dynamic terms, insofar as, under these conditions, the two composite unbalanced-mass bodies (both pairs) tend to selfsynchronization in the oscillating state (as in the case of a double-unbalanced directional oscillator), this being known to a person skilled in the art. When the unbalanced-mass part-bodies of different type are arranged on a common axis of rotation, this property may be utilized particularly advantageously in such a way that any positively synchronizing gearwheels may be dispensed with.

Two terms used in the claims are defined in more detail below: the term "cut in" (for example, of an adjusting braking torque acting on the unbalanced-mass part-bodies of one type) is derived from the overriding term "cut in" of a torque. Cut in a torque means, in this respect, that the function of a braking or acceleration actuator is activated, without this activation being dependent on the output signal from a closed control loop for regulating the phase angle β. A "stop is produced dynamically" when the stop faces are guided toward one another as a result of a relative movement of the unbalanced-mass part-bodies of different type, so that the relative movement is terminated essentially by the stop impact and not by a regulating measure.

In FIG. 1*a,* a vibrator is designated by 100 and the hydraulic circuit for operating the vibrator is designated by 150. The diagrammatically illustrated vibrator 100 with two motors M1 and M2 is used in an identical version in all the part-drawings of FIGS. 1 to 3 and is therefore described only once with reference to FIG. 1. In FIG. 1*a,* a circle 102 symbolizes a gearwheel rotatable and drivable about an axis of rotation 104. The solid small circle 108 is designated diagrammatically the center of gravity of an unbalanced-mass part body and the bar designated by 106 symbolizes the lever arm of the center of gravity. 106 and 108 together symbolize an unbalanced-mass part-body which is rotatable about the axis of rotation 104 and which at the same time represents a centrifugal-force part-vector and a part-moment of the total resultant static moment $M_{Res}$. The features designated by 102, 106 and 108 together form a symbol which is used several times and is designated as a whole by U1-1. A character combination starting with the letter U will therefore always mean in summary: an unbalanced-mass part-body with the centrifugal-force part-vector illustrated at the same time with regard to its direction by the position of the bar (106) and a gearwheel (102) connected to the unbalanced-mass part-body so as always to transmit torque. Overall, the reference characters U1-1, U1-2, U2-1 and U2-2 illustrate the four unbalanced-mass part-bodies of a directional vibrator. In each case two unbalanced-mass part-bodies, specifically U1-1 and U1-2, on the one hand, and U2-1 and U2-2, on the other hand, are positively synchronized, via their associated and intermeshing gearwheels, to rotate in opposite directions. The unbalanced-mass part-bodies combined in this way are also designated as follows by: unbalanced-mass part-bodies of the first type (U1-1, U1-2) and unbalanced-mass part-bodies of the second type (U2-1, U2-2). Insofar as the operating mode of the two groups of unbalanced-mass part-bodies is to be described in entirely general terms, an unbalanced-mass part-body of one type and an unbalanced-mass part-body of the other type are also referred to.

The directions of rotation and also the rotational speeds of the unbalanced-mass part-bodies of the first type and second type are in each case designated by the arrows ω1 and ω2. The unbalanced-mass part-bodies illustrated may be contained in different types of vibrators. For example, the unbalanced-mass part-bodies could be arranged on their own four axes of rotation arranged parallel to one another. As compared with the figures in EP 0 506 722, U1-1 and U1-2 could correspond to the unbalanced-mass part-bodies 107 and 108 of FIG. 1 and U2-1 and U2-2 to the unbalanced-mass part-bodies 104 and 105 of FIG. 1 and could also execute the operating mode described there. The unbalanced-mass part-bodies could, for example also be arranged with concentrically coinciding axes of rotation, as is illustrated in EP 0 473 449 B1. Here, U1-1 and U1-2 could correspond to the unbalanced-mass part-bodies 51B and 52B of FIG. 6 and U2-1 and U2-2 to the unbalanced-mass part-bodies 51A and 52A of FIG. 6. The illustration of the operating mode of the unbalanced-mass part-bodies in FIGS. 1 to 3 assumes primarily that the axes of rotation of the unbalanced-mass part-bodies U1-1 and U2-1 and the axes of rotation of the unbalanced-mass part-bodies U1-2 and U2-2 coincide concentrically, as compared with the arrangement in FIG. 6 of EP 0 473 449 B1. It goes without saying that the axes of rotation are always mounted in a frame (not depicted), in a comparable way to the vibrator according to FIG. 4. The mass of the frame makes up the greatest part of the oscillating mass "m".

The unbalanced-mass part-bodies U1-1 and U2-1, on the one hand, and U1-2 and U2-2, on the other hand, define the phase angle β (for example,=180° in FIG. 1*a*), in the case of a different relative rotary position, and are therefore also designated as "pairs" of unbalanced-mass part-bodies of different type.

In vectorial terms, the unbalanced-mass part-bodies designated as being of the same type and positively synchronized by gearwheels always generate a resultant centrifugal force in the vertical direction with a uniform amplitude. In order to achieve a change in the amplitude of the entire vibrator frame, the unbalanced-mass part-bodies of different type can be rotated relative to one another through a specific phase angle β, with the result that the total centrifugal-force vector moving the vibrator is obtained from the resultant centrifugal forces of the different types by superposition. In FIG. 1*a,* a phase angle of β=180° is set, this corresponding to a minimum position. The relative position of the unbalanced-mass part-bodies U1-2 and U2-2, which corresponds to the phase angle β=180°, is ensured by the special stop coupling C which performs a double function. On the one hand, the stop coupling C makes it possible for the unbalanced-mass part-bodies U1-2 and U2-2 rotating on a common axis of rotation to be capable of being rotated relative to one another, their relative position being limited by two stops in such a way that, in a first stop position, a phase angle of β=180° occurs (shown in FIG. 1*a*) and that, in a second stop position, a phase angle of β=0° or a maximum position occurs (shown in FIG. 1*b*). The second function of the stop coupling C is that, in the stop positions, it can transmit torques from one unbalanced-mass part-body to the other, the effective direction of the torques being dependent on the assumed stop position.

The stop coupling C has special elements for carrying out these functions: connected to the unbalanced-mass part-body U1-2 is a torque-transmitting part 110, at the end of which is located a first stop lever 112. Connected to the unbalanced-mass part-body U2-2 is a torque-transmitting part 118, at the end of which is located a stop crank 116. The diagrammatic illustration in FIG. 1*a* is intended to show that the first stop lever 112 forms a stop contact with the stop crank 116 such that a torque is transmitted from the first stop lever 112 to the stop crank 116. In order to make this situation clearer for subsequent explanations, on the left, next to the stop coupling C, is depicted a small part-view A1 which is obtained, looking in the direction of the arrow A toward the end of the part 110. The first stop lever 112 is symbolized by 112' and the stop crank 116 by 116'. The arrow 120 is intended to show that the torque is transmitted from 112' to 116'.

Figure 1B:
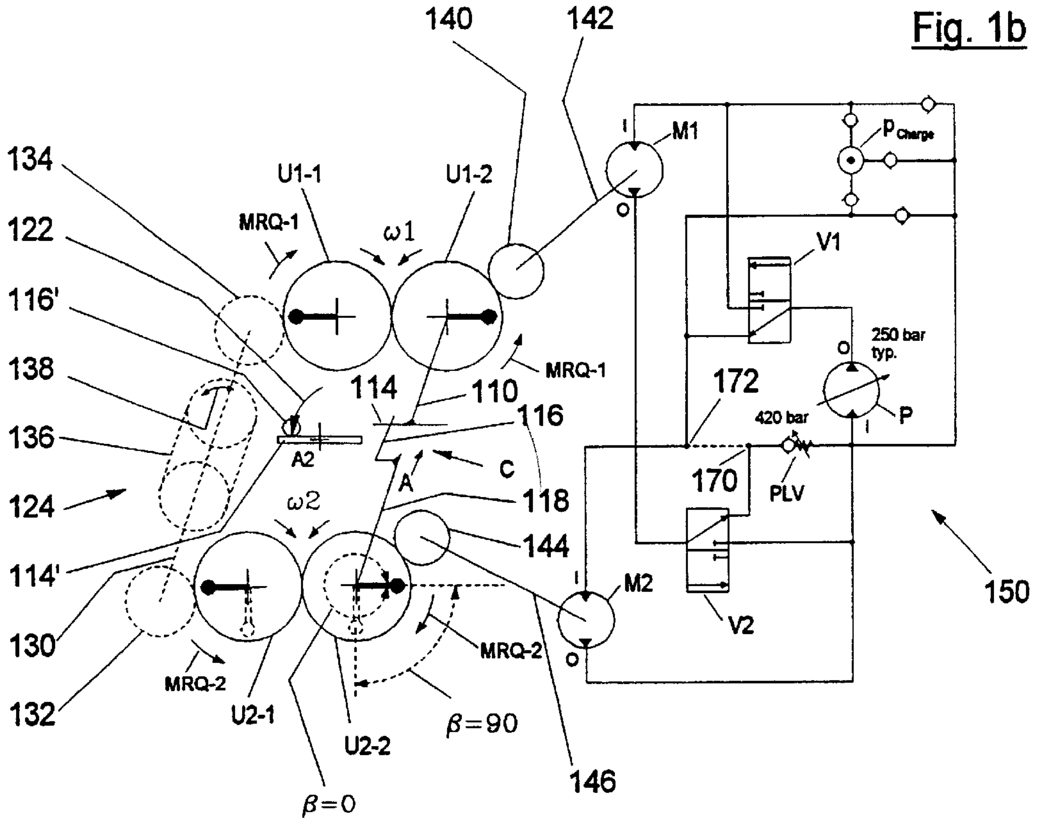

FIG. 1*b* illustrates diagrammatically the same vibrator as in FIG. 1*a,* but with the difference that the stop coupling C has assumed another position and that the phase angle is thereby set at a value β=0° (corresponding to a maximum position) FIG. 1*b* shows a second stop lever 114 which, just like the first stop lever 112, is mounted at the end of the torque-transmitting part 110. FIG. 1*b* is intended to show that the second stop lever 114 forms with the stop crank 116 a stop contact such that a torque is transmitted from the stop crank 116 to the second stop lever 114. In order to make this situation clearer for subsequent explanations, oil the left, next to the stop coupling C, is depicted a small part-view A2 which is obtained, looking in the direction of the arrow A toward the end of the part 110. The second stop lever 114 is symbolized by 114' and the stop crank 116 by 116'. The arrow 122 is intended to show that the torque is transmitted from 116' to 114'.

The diagrammatic illustration of the identical vibrators used in FIGS. 1 to 3 shows (indicated by drawing with broken lines) a subassembly 124 which is to be used alternatively to implement stop functions, such as may also be assumed by the stop coupling C. The subassembly 124 is described in more detail with reference to FIG. 1*b:* the subassembly 124 is drive-connected, on the one hand, to the unbalanced-mass part-bodies of the second type U2-1 and U2-2 via the gearwheel 132 and, on the other hand, to the unbalanced-mass part-bodies of the first type U1-1 and U1-2 via the gearwheel 134. The likewise corotating stop group 136 is arranged on the same axis of rotation 130 as that of the gearwheels. The double arrow 138 is intended to symbolize that the stop group 136 allows relative rotation of the gearwheels 132 and 134 until a double stop contained in the stop group is reached.

The unbalanced-mass part-bodies of the first type U1-1 and U1-2 are driven by a hydraulic motor M1 which transmits its torque to the gearwheel of the unbalanced-mass part-body U1-2 via a shaft 142 and via a gearwheel 140. The unbalanced-mass part-bodies of the second type U2-1 and U2-2 are driven by a hydraulic motor M2 which transmits its torque to the gearwheel of the unbalanced-mass part-body U2-2 via a shaft 146 and via a gearwheel 144. Depending on the direction of the torques generated by the motors, the relative positions of the unbalanced-mass part-bodies of a pair can also be changed during the rotation of the unbalanced-mass part-bodies. In this case, when the stops are used, by means of torques acting differently on the unbalanced-mass part-bodies, the phase angle β can be adjusted from a first position, corresponding to a minimum amplitude of oscillation of the vibrator (β=180° in FIG. 1*a*), into a second position, corresponding to a maximum amplitude of oscillation of the vibrator β=0° in FIG. 1*b*).

However, the adjustment of the phase angle β from a first position (β=180° in FIG. 1*a*) into a second position (β=0° in FIG. 1*b*) is not readily possible. The reason for this is the (average) reaction torques MRQ which are to be overcome during the run through of the adjustment angle and the mode of action of which is explained in more detail, for example, in the documents WO 97/19765 and WO 94/01225 (the latter refers to MR instead of MRQ). The reaction torques MRQ occurring in the vibrators according to the invention are depicted in FIGS. 1 to 3 with the correct sign with the aid of corresponding arrows. It can be seen from FIG. 1*a,* for example, that, during the adjustment of the phase angle β from the first position (β=180°) into the second position (β=0°), a reaction torque MRQ-2 arises on the unbalanced-mass part-bodies U2-1 and U2-2, which, at the moment when the adjustment of the phase angle β occurs, seeks to prevent the further rotation of the unbalanced-mass part-bodies U2-1 and U2-2 in the direction of ω2 and which consequently opposes the desired adjustment.

However, the adjustment from one position into the other may take place not only by torques generated by motors being applied, but also as a result of the action of those mass torques which are generated by dynamic mass forces of the polar moments of inertia of the parts corotating in each case with said unbalanced-mass part-bodies. When, for example, in FIG. 1*a,* starting from a rotation of all the unbalanced-mass part-bodies which takes at a uniform rotational speed and starting from a phase angle β=180° assumed at the same time, the unbalanced-mass part-bodies U1-1 and U1-2 are suddenly braked, their original rotational speed decreasing, the mass torques of the corotating parts of the unbalanced-mass part-bodies U2-1 and U2-2 may assume a magnitude such that this is sufficient to overcome the adjustment-counteracting reaction torques MRQ-2 of the unbalanced-mass part-bodies U2-1 and U2-2 and consequently to initiate and carry out an adjustment of the original first position of the phase angle β (=180°), specifically until the second position of the phase angle β (=0°) is reached. Such a possible effect is also utilized by the invention. If the braking moment on the unbalanced-mass part-bodies U1-1 and U1-2 is too low, the reaction torques MRQ-2 on the unbalanced-mass part-bodies U2-1 and U2-2 cause a backturn of the angular adjustment already initiated, so that the intended adjustment of the phase angle β does not come about.

The utilization of the effect of the dynamically generated mass torques takes place, in FIG. 1, essentially in that the motors M1 are briefly braked sharply hydraulically. This may be carried out by means of various measures, of which three different hydraulic measures according to the invention are explained in more detail in FIGS. 1 to 3. In a further version of the invention, the high hydraulic pressure capable of being generated during the braking operation is conducted into the inlet line of the motor M2 and the dynamic mass torque acting on the unbalanced-mass part-bodies U2-1 and U2-2 is therefore also assisted by a motor-generated torque, in order to achieve angular adjustment with even lower braking of the motor M1.

The hydraulic circuits used in FIGS. 1 to 3 are to be closed circuits, but, alternatively, open circuits could also be employed in a different circuit configuration. A person skilled in the art is well aware of the appropriate circuits. The description of the individual figures can therefore be restricted to special effects. The part-FIGS. 1*a,* 2*a* and 3*a* in each case illustrate that circuit by means of which it was possible to bring all the unbalanced-mass part-bodies to a constant working rotary frequency prior to the operation of angular adjustment. Part-FIGS. 1*b,* 2*b* and 3*b* in each case illustrate that circuit by means of which the adjustment operation was begun.

In FIG. 1*a,* first, starting from standstill, in which standstill all the unbalanced-mass part-bodies were oriented with their centers of gravity in the direction of gravitational acceleration and therefore corresponded to a maximum position, all the unbalanced-mass part-bodies were brought to the constant working rotary frequency solely by means of the driving torque of the motor M1, the change in rotary frequency of the motor M1 being brought about by an adjustment of the feed volume flow of the pump P. In this case, as early as shortly after the start, the dynamic production of a stop or the assumption of the shown position of the stop coupling C (β=180°, amplitude minimum) occurred. The shown minimum position of the stop coupling C is maintained, even after the working rotary frequency is reached, inter alia also because the motor M2 has to be dragged along. FIG. 1*b* shows the situation at the start of adjustment of the phase angle β. Due to the changeover of the valves V1 and V2 carried out at the same time, the driving pressure was cut off at the inlet I of the motor M1 and, at the outlet O of the motor M1, a braking pressure builds up, which is set by means of the pressure relief valve PLV, via which the backstream from the motor M1 can flow to the pump again. Optionally, a connection to the line point 172 may be made from the line point 170, as a result of which the high pressure generated at the motor outlet O can be conducted to the inlet I of the motor M2.

After the stop position, shown in FIG. 1*b,* of the stop coupling C, corresponding to a maximum position, has been reached, the valve V2 is switched back again. From this moment, the motor M1 is dragged along, with the result that the maximum position assumed can be maintained reliably. In the circuit shown in FIG. 1, therefore, the motor M2 must also convert the entire useful power transmitted by the vibrator. The reverse adjustment of the phase angle β into the minimum position takes place by the valves V1 and V2 being switched back, with the result that the motor M2 has to be dragged along again. Due to the drag torque of the motor M2 and because of the effect whereby the vibrator automatically endeavors to maintain the minimum position reached, in the event of a subsequent slow reduction in the feed volume flow of the pump P the minimum position can be maintained until standstill is reached. When there is a rapid reduction in the feed volume flow, it is possible, in any event, to ensure that the minimum position is maintained, by a throttle element being inserted into the return line of the motor M2 (as shown by 200 in FIG. 2).

Figure 2A:
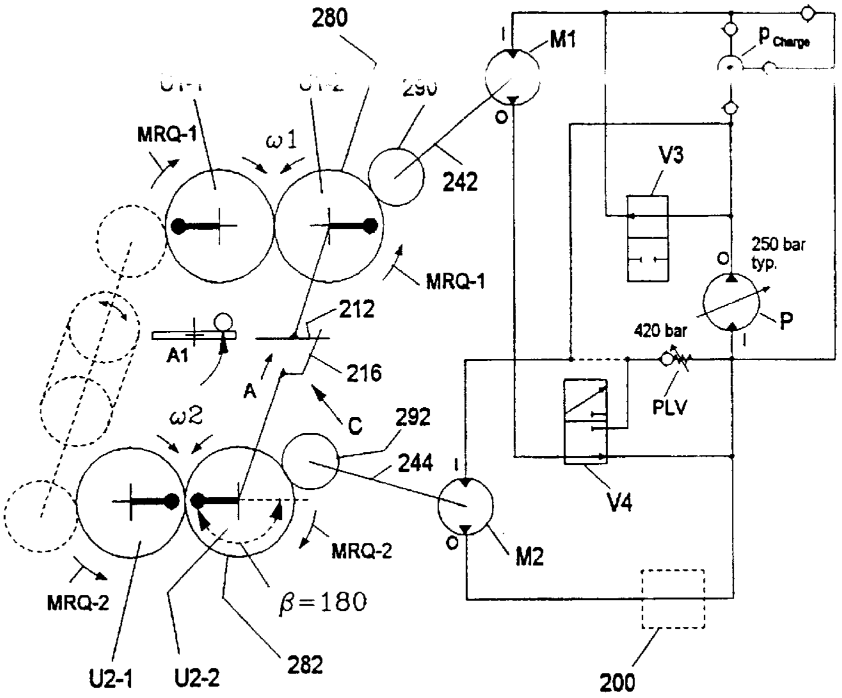
FIGS. 2*a* and 2*b* show a diagram of an exemplary embodiment with a pump and two motors, in each case both motors being subjected to power during the operation of the vibrator with different static moments.

In FIG. 2*a,* first, starting from standstill, all the unbalanced-mass part-bodies were brought to the constant working rotary frequency by means of the driving torques of the motors M1 and M2. In this case, as early as shortly after the start, the shown position of the stop coupling C was assumed as the minimum position (β=180°, amplitude=minimum), because, in this case, the unbalanced-mass part-bodies automatically endeavor to reach this position. If required, it is possible, by means of an additional switching element 200 to be cut in temporarily, to ensure that, as early as immediately when the rotation of the unbalanced-mass part-bodies starts, the shown position of the stop coupling C is assumed by a dynamic stop being produced. In the case of the switching element 200, a switching command is to be capable of cutting in a function, by means of which the pressure in the connecting line between the motor M2 and the switching element 200 is increased to a specific value. In order to avoid the energy loss occurring when a throttle is used, the switching element 200 could also be designed as a motor (for example, axial piston motor) which has a variable throughflow volume and of which the drive power obtained could be supplied to the drive of the pump again. With the controllability of such an adjustable motor being utilized, the functions of the valves V3 and V4 could also be simulated, so that these could be dispensed with.

Figure 2B:
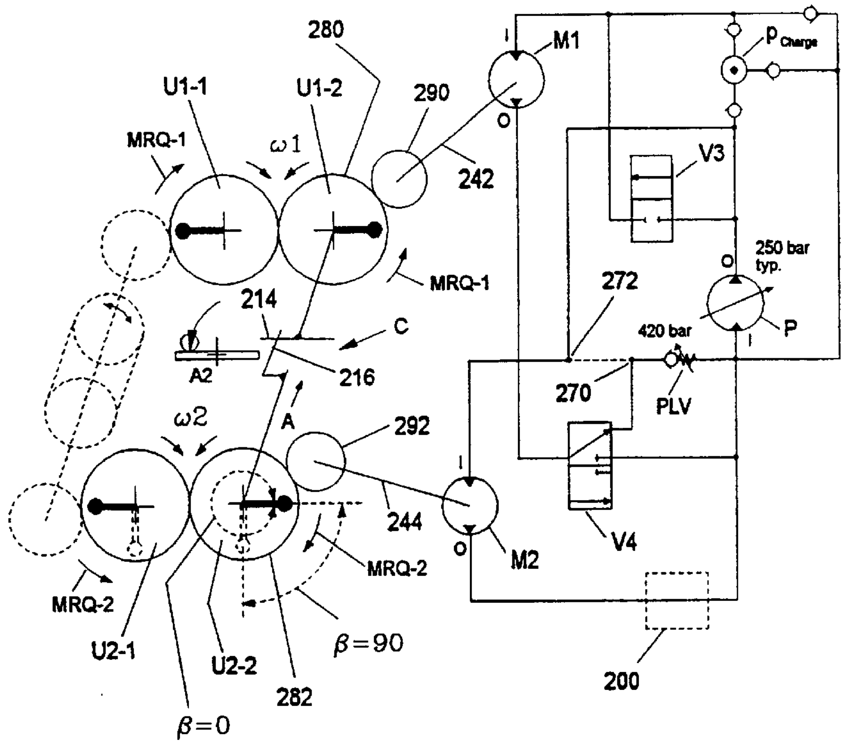

FIG. 2*b* shows the situation at the start of adjustment of the phase angle. As a result of the changeover of the valves V3 and V4 carried out at the same time, the driving pressure was cut off at the inlet I of the motor M1, and, at the outlet O of the motor M1, a braking pressure builds up which is set by means of the pressure relief valve PLV, via which the backstream from the motor M1 can flow to the pump P again. Optionally, a connection to the line point 272 may be made from the line point 270, as a result of which the high pressure generated at the outlet O of the motor M1 can be conducted to the inlet I of the motor M2. After the stop position, shown in FIG. 2*b,* of the stop coupling C, as maximum position, has been reached, the valves V3 and V4 are switched back again. In order to ensure that the maximum position is maintained, measures may be taken, such as, for example, the use of a mechanical interlock, shown in FIG. 4, of two unbalanced-mass part-bodies relative to one another, which is switched by means of auxiliary energy, or the utilization of the effect of the reversal in direction of the reaction torques MRQ in the case of the setting of a maximum position with a phase angle β<0° (referred to later as "over-adjustment"). Even after the phase angle β has been changed over into the maximum position shown in FIG. 2*b,* the two motors M1 and M2 can transmit their power in parallel. The phase angle β may be switched back from the maximum position into the minimum position at a set working rotary frequency, for example, by the already mentioned switching element 200 being used for a short time. When the vibrator is stopped as a result of a reduction in the feed volume flow of the pump P from the working rotary frequency, the maintaining of the minimum position may be achieved in that the motor M2 generates a higher braking torque than the motor M1 as a result of the cut in of the switching element 200 having a throttling effect.

The adjusting device according to FIG. 3 operates with two hydraulic motors M1, M2 of the same size which are connected in series. The hydraulic control 300 for the motors contains an electric pressure regulating valve $V_{PC}$ which is fed from a special pressure source $S_P$ and which is capable of being set electrically to three different outlet pressures $P_{Adj-1}$ to $P_{Adj-3}$. Moreover, the pressure regulating valve has the property of being capable of reducing a pressure prevailing at its outlet and caused by the other side and higher than the set pressure by means of a volume flow flowing rearward into the valve (and to a leakage outflow).

Figure 3A:
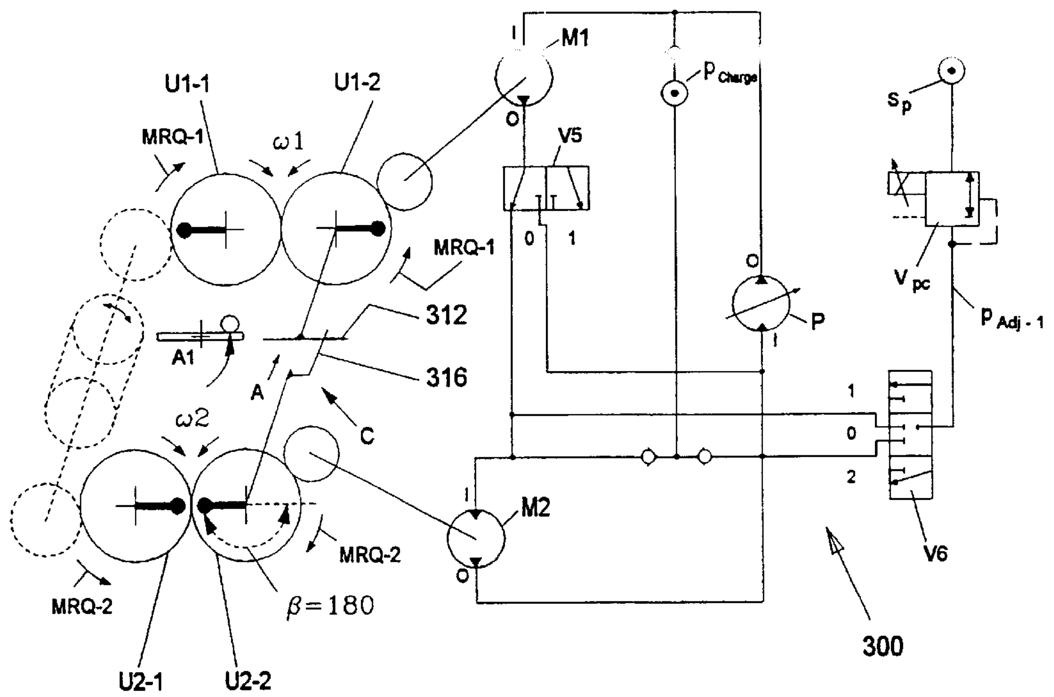
FIGS. 3*a* and 3*b* show a diagram of an exemplary embodiment with a pump and two motors connected in series, the power to be supplied to the vibrator being distributed to both motors during the operation of the vibrator with different static moments.

The adjusting device can execute the following mode of operation in a plurality of phases from the run up of the vibrator to the stopping of the latter, starting with the positions 0 of the two valves V5 and V6: as early as during the operation of leaving the position of rest of the vibrator, in the case of a rotary frequency lower than the working rotary frequency a minimum position is set and is subsequently maintained. When the vibrator is at a standstill, all the unbalanced-mass part-bodies are oriented so as to hang down under the action of gravitational acceleration. As a result of the cut in of the valve V5 in position 1, with the small feed volume of the pump P being set, first the unbalanced-mass part-bodies U1-1 and U1-2 are rotated through about 180°, after which the valve V5 is switched back to position 0 and, at the same time, an increase in the feed volume of the pump P takes place according to a predetermined time ramp. When the vibrator is running up to the working rotary frequency, the motor M2 is dragged along, without a pressure gradient, as a driving torque, taking effect on it. This is due to the fact that the pressure falls at the inlet of the motor M2, because the volume flow emerging at the outlet of the motor M1 is lower, as a result of leakage within the motor, than the volume flow entering at the inlet. FIG. 3*a* shows the set minimum position after the working rotary frequency is reached, said minimum position being maintained automatically by the vibrator.

Figure 3B:
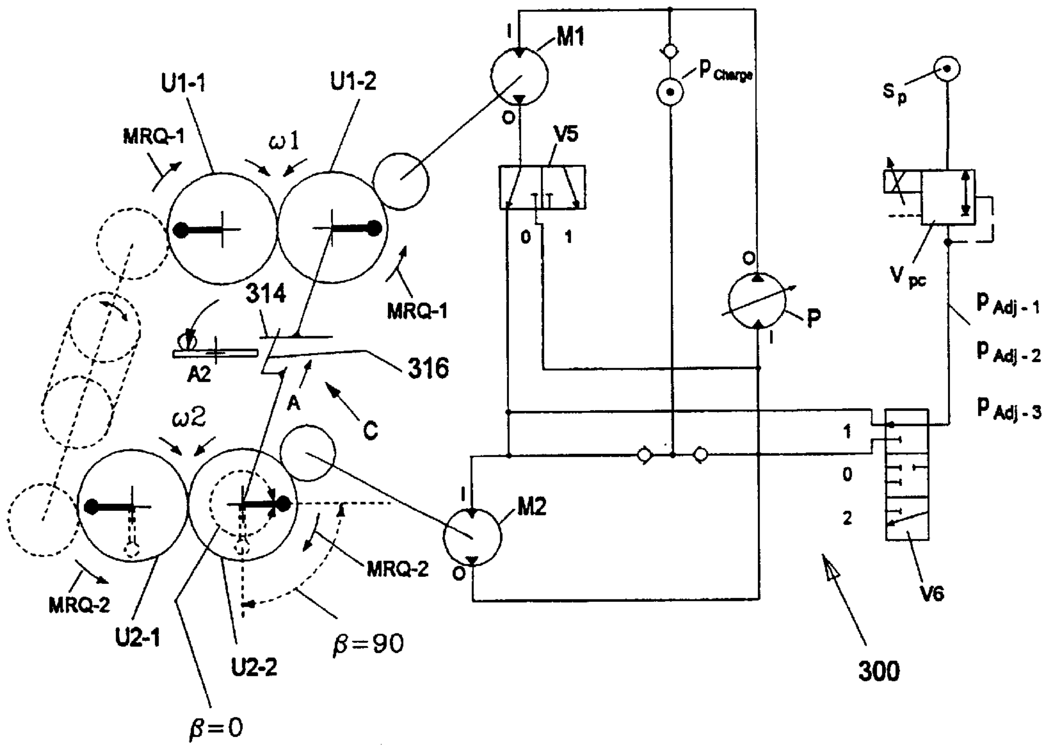

The adjustment of the phase angle β from the minimum position to the maximum position at a set working rotary frequency takes place as a result of modulation, carried out at the inlet of the motor M2, with an adjusting pressure $P_{Adj-1}$ which is increased (as compared with the pressures present at the inlet of the motor M2 during the minimum position), when the valve V6 is in the position 1. As a result, at the same time, adjusting braking torques take effect on the unbalanced-mass part-bodies of one type (U1-1, U1-2) and adjusting acceleration torques take effect on the unbalanced-mass part-bodies of the other type. The maximum position reached in this case is illustrated in FIG. 3*b*.

The maximum position is secured against the influence of restoring torques, using the same principle which served for setting the maximum position. In this case, with the valve V6 being in position 1, the inlet of the motor M2 is modulated with another special adjusting pressure $P_{Adj-2}$, the magnitude of which is sufficient to prevent a restoration. The magnitude of the adjusting pressure $P_{Adj-2}$ is adapted to the operating situation, using a special control algorithm for generating a variable control signal for the pressure regulating valve $V_{PC}$.

The resetting of the phase angle β from the maximum position to the minimum position at a set working rotary frequency is carried out by brief modulation with the already mentioned special adjusting pressure $P_{Adj-2}$ *at* the outlet of the motor M2, with V6 being in position 2. By virtue of this measure, a braking moment is generated on the motor M2. Alternatively, the inlet of the motor M1 could also be modulated with a pressure having an enhanced effect there, in order to accelerate the motor M1. In principle, for resetting the phase angle β from the maximum position to the minimum position, it is sufficient merely to initiate the correspondingly necessary relative rotation of the unbalanced-mass part-bodies. As soon as the phase angle β has been adjusted into the range 0°<β<180°, external power is no longer required because the vibrator executes an automatic return to the minimum position as a result of the effect of the reaction torques MRQ.

During the operation of stopping the vibrator from the working rotary frequency, the minimum position is maintained as follows: a reduction in the volume flow of the pump P to the value zero takes place according to a predetermined time ramp. Simultaneously with the reduction, a low pressure $P_{Adj-3} \geqq P_{Charge}$ is switched to the inlet of the motor M2, with the valve V6 being in position 1. By the volume flow of the pump P being reduced, the motor M2 is braked, while the motor M1 attempts to run forward. The particular property on the pressure regulating valve $V_{PC}$ ensures that a pressure higher than the set pressure $P_{Adj-3}$ is reduced at the outlet of the motor 1 due to the fact that a volume flow flows rearward through the valve V6. As a result, there can be no braking pressure built up on the motor M1 and the braking torque of the unbalanced-mass part-bodies U1-1 and U1-2 is supported against the motor M2 via the stop C.

It is true that, even for the vibrator according to FIG. 3 with hydraulic motors connected in series, the motors, because of their lower load, can have smaller dimensions, as compared with the prior art.

Figure 4A:
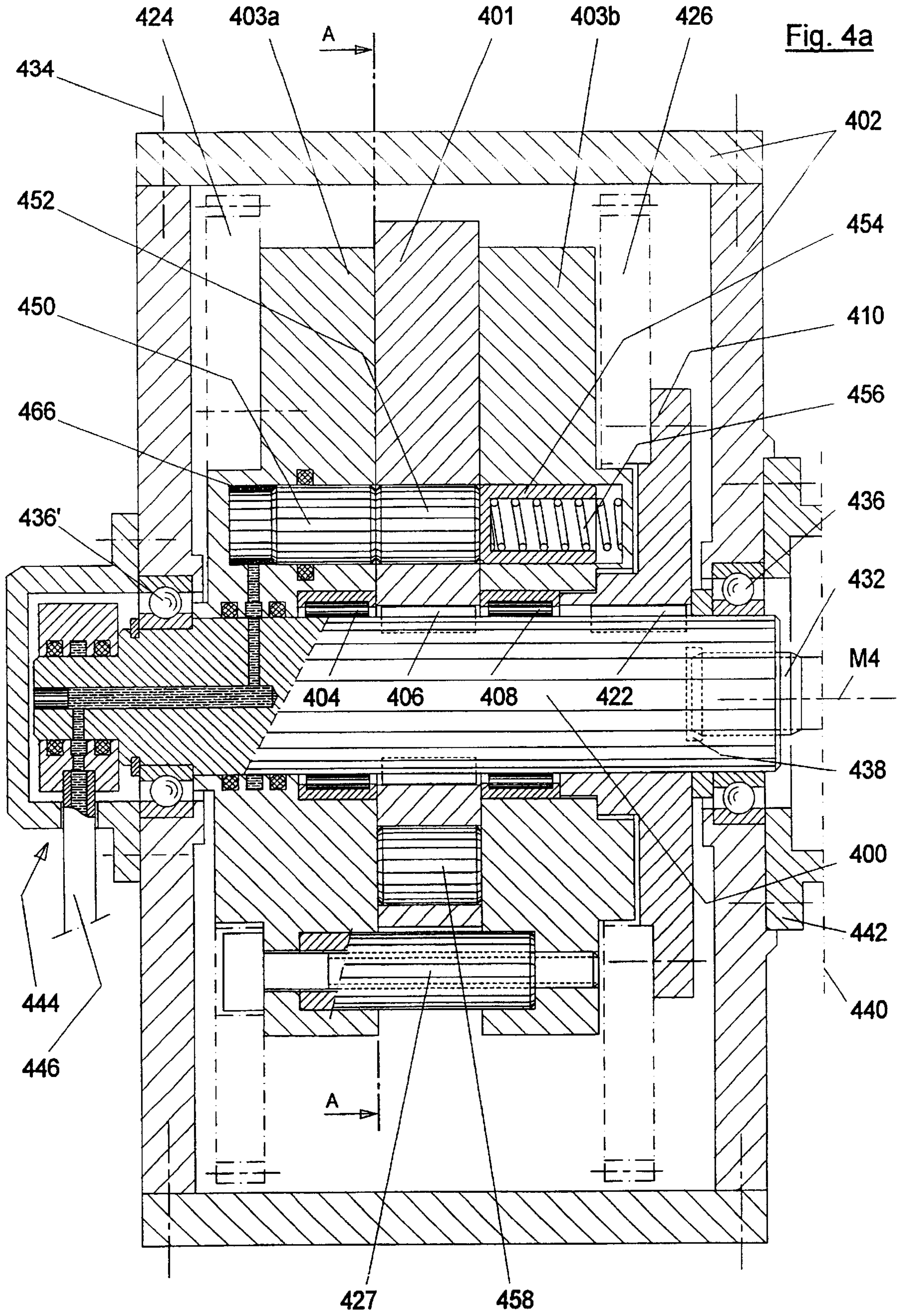
FIGS. 4*a* and 4*b* show an exemplary embodiment with unbalanced-mass part-bodies of the first and second type arranged concentrically on an unbalanced-mass shaft.
Figure 4B:
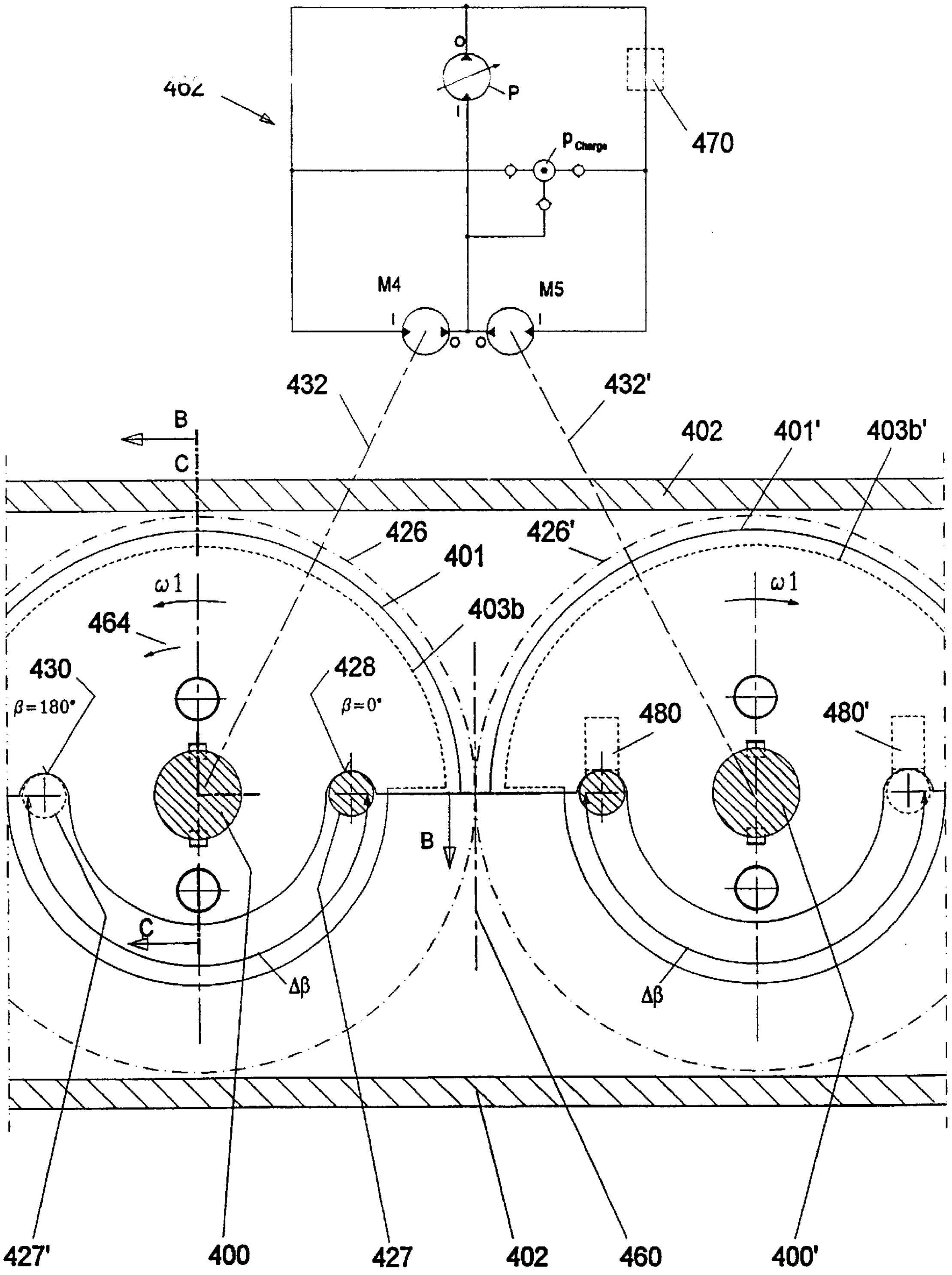

FIG. 4 shows the embodiment of a directional vibrator with unbalanced-mass part-bodies of different type arranged concentrically on an unbalanced-mass shaft 400 and adjustable relative to one another through an adjustment angle Δβ (=180°). FIG. 4*a* illustrates a vertical section through the axis of rotation of the unbalanced-mass shaft 400, in which the unbalanced-mass part-bodies 403*a* and 403*b* follow a sectional line designated by B—B in FIG. 4*b*, while all the other parts correspond to the sectional line marked by C—C in FIG. 4*b*. The phase angle setting shown in FIG. 4*a* corresponds to a maximum position, in which, however, the possible mechanical interlock of this position is not yet cut in. For the sake of simplicity, screws for connections of various parts were replaced in FIG. 4 by center point lines (for example, 434). A vibrator having two versions can be operated by means of the arrangement illustrated in FIG. 4. In one version 1, the unbalanced-mass shafts 400 and 400' are driven directly by two hydraulic motors M4 and M5 arranged coaxially to them, as illustrated diagrammatically in FIG. 4*b*. For this version, one or both of the gearwheels 424 and 426 illustrated by dashed and dotted lines could, in principle, be dispensed with, since, after the interlocking of the unbalanced-mass part-bodies, synchronous guidance occurs automatically and may even be assisted by other control means, known to a person skilled in the art, for the rotary angles of the motors. In version 2 described later, the unbalanced-mass shafts are driven according to a diagram shown in FIG. 2.

FIG. 4*a* illustrates an unbalanced-mass shaft 400 mounted in a housing 402 by means of rolling bearings 436 and 436'. On the right side, the unbalanced-mass shaft is provided with a bore 438 with a special internal toothing, into which bore is introduced the shaft end 432 of a hydraulic motor M4, said shaft end being provided with a corresponding external toothing. The motor M4 located on the right of the separating line 440 and carried by the adapter flange 442 is symbolized by a center line. At the left end, the unbalanced-mass shaft carries a rotary leadthrough 444 connected to a pipe 446, via which, under the control of a hydraulic switching member (not shown), a pressure fluid can both be supplied under pressure and be returned in a pressureless state. One unbalanced-mass part body of one type 401 is connected in a torque-transmitting manner to the unbalanced-mass shaft 400 with the aid of two fitting keys, while the two parts 403*a* and 403*b* of the unbalanced-mass part body of the other type are mounted rotatably relative to the unbalanced-mass shaft with the participation of the needle bearings 404 and 408. A flanged bush 410 for receiving the gearwheel 426 is likewise connected fixedly in terms of rotation to the unbalanced-mass shaft 400 with the aid of a fitting key 422. The part 403*a*, which on its left side carries a second gearwheel 424, is connected to the part 403*b* by means of a stop pin 427 which serves both for transmitting a torque between the two parts and as a stop member for forming two stops to limit the relative rotation of the unbalanced-mass part-bodies of different type.

The two stops are formed during the contacting of the stop pin 427 with one of the two stop faces 428 and 430 (FIG. 4*b*), said stop faces being embodied on the unbalanced-mass part-body of one type 401. As may be gathered from FIG. 4*b*, the maximum position shown in FIG. 4 or the associated phase angle β=0° is defined by one stop at which the stop pin 427 is in contact with the stop face 428. Starting from this stop, after a relative rotation of the two unbalanced-mass part-bodies 401 and 403 through the angle Δβ the other stop is formed, at which the stop pin 427 (designated by 427' in this position) is in contact with the stop face 430 and at which the minimum position is set at a phase angle of β=180°.

The unbalanced-mass part-bodies 401 and 403 can be fixed in their relative position by means of a switchable mechanical interlock, both in the minimum position and in the maximum position, with the participation of the three parts: driving pin 450, locking pin 452 and bush 454, which are axially displaceable in their receiving bores. The interlock is brought about by the outward movement of the driving pin 450 which is capable of being acted upon on its left side, in the cylinder 466, by the pressure fluid and which at the same time displaces the other two parts to the right, until the bush 454 comes to rest on the bottom of its bore. During the displacement of all three parts, the parts 450 and 452, by penetrating into the bore of the part in each case adjacent to them, assume an interlocking function. The interlock is canceled by the pressure fluid being switched to pressureless on the left side of the driving pin 450, with the result that it becomes possible for the spring 456 to displace all three parts into the depicted initial position again. The interlocking function described may also take place when the unbalanced-mass part-body 401 is adjusted relative to the unbalanced-mass part-body 403 out of the depicted maximum position into the minimum position through the adjustment angle Δβ (for example, 180°). After such adjustment, the locking pin 458 takes the place of the locking pin 452, and vice versa.

It may be gathered from FIG. 4*b* that the second unbalanced-mass shaft 400', together with the parts carried by it, is constructed identically to the unbalanced-mass shaft 400, but mirror-symmetrically to the axis of symmetry 460 and with a center distance such that the two gearwheels in each case mesh with one another. The centerline 432 symbolizes the coaxial connection of the unbalanced-mass shaft 400 to the motor M4 and the centerline 432' symbolizes the coaxial connection of the unbalanced-mass shaft 400' to the motor M5. The diagram of the hydraulic circuit 462 shows that the motors M4 and M5 (of equal size) are connected in parallel to a pump operated in a closed circuit. The pump P is variably adjustable with respect to the volume flow fed by it. It may be adjusted continuously for the purpose of varying the rotary frequency of the vibrator. However, the adjustment of the volume flow may also take place in a jump, in order thereby to make it possible to generate on the motors torque jumps which, in the form of adjusting braking torques or adjusting acceleration torques, serve for adjusting the phase angle β.

The adjustment angle Δβ lying between the minimum position and the maximum position does not necessarily have to be 180°. Starting from a minimum position β=180°, if an adjustment angle Δβ>180°, with "overadjustment", is used, a maximum position may be reached in the case of a phase angle β<0°, at which the maximum position is maintained automatically by virtue of the then reversed effective directions of the reaction torques MRQ. Where an adjustment angle Δβ<180° is used, a maximum position is reached in the case of a phase angle β>0°. In this case, if an artificial fixing of this maximum position is dispensed with, an automatic return of the vibrator into the minimum position takes place due to the effect of the reaction torques MRQ. As indicated in FIG. 4*b* by the members depicted by broken lines 480 and 480', the stops could also be equipped with damping functions. The members 480 and 480' could, for example, be pistons of hydraulic dampers which are arranged in the unbalanced-mass part-bodies 401 and 401' in a plane perpendicular to their axes of rotation.

A vibrator according to version 1 operates as follows: where the vibrator is at a standstill, all the unbalanced-mass part-bodies hang down and, with the interlock cut out, automatically form a maximum position. During the simultaneous starting of the motors, taking place from zero according to a time ramp as a result of an adjustment of the volume flow of the pump P, the minimum position is reached (stop pin 427' at stop face 430) after approximately half a revolution (in the direction of the arrows ω1) of the unbalanced-mass part-bodies 401, 401' (only these are initially rotated), said minimum position being maintained, even after the working rotary frequency is reached, as a result of the developing adjusting acceleration torque and, at a higher rotational speed, as a result of the endeavor of the automatic setting to assume a minimum position. After the working rotary frequency has been reached, the pump volume flow is lowered briefly by means of a switching operation on the pump, with the result that an adjusting braking torque is briefly generated on the unbalanced-mass part-bodies 401. Due to the polar mass moment of inertia, the unbalanced-mass part-bodies 403, 403' overtake the unbalanced-mass part-bodies 401, 401' in the direction of the arrow 464 and there is a stop (427+428) with the assumption of the maximum position. Since the driving pin 450 had already been loaded on its left side with a pressurized pressure fluid during the operation of angular adjustment, the unbalanced-mass part-bodies are interlocked relative to one another immediately after the maximum position is assumed.

The resetting from the maximum position to the minimum position is enabled by the release of the pressure in the cylinder space 466. Since a maximum position is assumed in the case of a phase angle of β>0°, the automatic resetting of the phase angle into the minimum position occurs immediately after the release as a result of the effect of the reaction torques MRQ. The resetting of the phase angle into the minimum position may alternatively be brought about by a brief increase in the volume flow of the pump P, as a result of which an acceleration of the unbalanced-mass part-bodies 401, 401' takes place, or alternatively, when at least the two gearwheels 426 and 426' are used, may be initiated in that a throttle member 470 in the supply line to the motor M4 is cut in for a short time. This gives rise to a briefly acting adjusting acceleration torque on the motor M4, with the result that a lead of the unbalanced-mass part-bodies 401, 401' relative to the unbalanced-mass part-bodies 403, 403' occurs. In the operation of stopping the vibrator from the minimum position, first the interlock is cut in. Then, with the interlock maintained, the motors are braked to the value zero by the pump volume flow being reduced. After stopping has taken place, the interlock can be canceled. Alternatively, a rapid stopping of the vibrator, with a simultaneous changeover from the maximum position to the minimum position, starting from the working rotary frequency (for example, if the drive motor of the pump fails), could also be assisted by an adjusting braking torque being generated on the unbalanced-mass part-bodies 403, specifically by means of a switchable braking member (not illustrated) which acts directly on one of the gearwheels 424, 424'. When at least the gearwheels 426 and 426' are used, the version 1 may also be operated with only a single motor.

The vibrator could be operated in a version 2, for example according to the arrangement shown in FIG. 2. In this case, it must be imagined that the gearwheels 280 and 282 shown in FIG. 2 correspond to the gearwheels 426 and 424 of FIG. 4 and that the motors M1 and M2 in FIG. 2 are brought with their gearwheels 290 and 292 into engagement with the gearwheels 426 and 424 in FIG. 4. In this case, there would be the following correspondences (the reference numeral after "=" always refers to the feature in FIG. 2): 401=U1-2;

403=U2-2; 427=216; 428=214; 430=212; 432=242, 432'=244. FIG. 4*a* in this case shows a maximum position corresponding to FIG. 2*b*.

In all the circuits according to the invention, the phase angle can also be maintained in the maximum position (β=0°) reliably against interfering torques in that, during the adjustment of the phase angle β into the maximum position, said phase angle falls short of β=0°, which, as a rule, also is tantamount to saying that the range of adjustment must be set at a value higher than Δβ=180°. In the case of such "overadjustment", although the set amplitude again becomes a little lower than the theoretically maximum possible amplitude, nevertheless, after the angular position has fallen short of β=0°, the magnitude ratios of the then effective reaction torques MRQ have become interchanged. As may be gathered, for example, from FIG. 2 of WO 97/19765 (taking into account the fact that the phase angle β is defined differently there), the curve KA, rising positively from point M, rises even further between point E and point D, while the curve KB falls further in the range E'–F'. Since the curves ΔMD describe the useful torque required in each case on the motors, it follows from this, with regard to the present invention, that the motor M1 (or M4) operated according to the curve KA requires a higher motor torque ΔMD than the motor M2 (or M5) along the path from point M to point D after point E has been exceeded. However, since, for example according to FIG. 2 of the present invention, the two motors M1 and M2 can transmit only an identical torque, the result of this is that, in the case of "overadjustment", a torque must be supplied to the unbalanced-mass part-bodies U1-1 and U1-2 via the stop coupling C, thus leading to the desired securing of the stop position. As a further alternative measure for securing the maximum position, there could also be provision for influencing the stop coupling C or the subassembly 124 by means of auxiliary actuation, in such a way that the assumed adjustment position is secured mechanically, for example using the function of a tooth coupling.

Instead of the hydraulic brakings described, mechanical braking could also be carried out, for example by means of a disk brake, on the unbalanced-mass part-bodies of one type. As an equivalent solution, instead of brief braking of one type of unbalanced-mass part-bodies, abrupt acceleration of one type of unbalanced-mass part-bodies could also be carried out, in which case, on the other type of unbalanced-mass part-bodies, a dynamic mass torque would be generated which could compensate the adjustment-preventing reaction torques MRQ on the other type of unbalanced-mass part-bodies. In this way, too, adjustment of the phase angle β from a minimum position into a maximum position could be carried out. The direction of rotation of the unbalanced-mass part-bodies of a pair may, for example if the subassembly 124 is used to form a stop, both be in the same sense and in the opposite sense. Since very rapid adjustment from the minimum position into the maximum position (and vice versa) is possible by means of the adjusting device according to the invention, it is also appropriate to operate the vibrator intermittently, with cut-in dwell times in the minimum position. Since power consumption is relatively low in the minimum position, a lower power consumption for the vibrator is obtained, on average, in the operating mode. This makes it possible to connect the vibrator to pump drive motors of lower power.

Not only piledriving vibrators come under consideration as an area of use for the invention, but also other working machines, such as, for example, soil compacting machines or vibrators for concrete block machines.

What is claimed is:

1. A method for operating an adjusting device for an unbalanced mass directional vibrator having at least two pairs of unbalanced-mass part-bodies and are driven to rotate about an associated axis having the vectorially summed centrifugal-force part-vectors form the resultant centrifugal-force vector, as a result of an action of said vectorially summed centrifugal-force part-vectors the mass of the vibrator being set in directed oscillations, a pair being formed by one unbalanced-mass part-body of a first type and one unbalanced-mass part-body of a second type, a phase angle β being adjustable by means of an adjusting device defined between the associated centrifugal-force part-vectors of the unbalanced-mass part-bodies of a pair during the rotation of the unbalanced-mass part-bodies, the drive for one of the rotating unbalanced-mass part-bodies and adjusting the phase angle β being brought about by using at least one motor of electrically operated motors and hydraulically operated motors, with an exception of that arrangement of two hydraulic motors hydraulically connected in series are provided for adjusting the phase angle β in the range β=180° (β=180° corresponding to a zero amplitude) to β=90° or in the range β=180° to β=270°, and the phase angle β being adjusted by a relative rotation of the unbalanced-mass part-bodies of the first type relative to the unbalanced-mass part bodies of the second type, the adjusting energy required for adjustment being derived from the at least one motor of the electrically operated motors and hydraulically operated motors connected to unbalanced-mass part-bodies so as to transmit torque, there being carried out by means of the adjusting device an adjustment of the phase angle β from a minimum position, with a position β(A) of the phase angle in which the amplitudes of oscillation have a minimum, to a maximum position, with a position β(E) of the phase angle in which the amplitudes of oscillation have a maximum, wherein the adjustment of the phase angle β from a minimum position to a maximum position is carried out by one of three ways:

cutting in an adjusting braking torque acting on at least one of the unbalanced-mass part-bodies of the one type; and, cutting in an adjusting acceleration torque acting on at least one of the unbalanced-mass part-bodies of the other type; and, cutting in both the adjusting braking torque and the adjusting acceleration torque and, when the maximum position is reached, the relative rotation is positively terminated by means of a mechanically acting stop, the stop being formed by two mutually contacting members, wherein one of two mutually contacting members is connected in a torque-transmitting manner to at least one of the unbalanced-mass part-bodies of one type and the other is connected in a torque transmitting manner to at least one of the unbalanced-mass part-bodies of the other type.

2. The method in accordance with claim 1, wherein the braking energy of one or more participating braking members being generated for the purpose of participating in the relative rotation in the direction of the maximum position, is metered by means of a combination of settings for the magnitude of the adjusting braking torque and for the braking duration, wherein the magnitude being either kept constant or being made dependent on one of the amount of the adjustment angle (β) covered, and an acceleration energy of one or more participating motors being generated for the purpose of participating in the relative rotation in the direction of the maximum position, is metered by means of a combination of the settings for the magnitude of the adjusting acceleration torque and for the acceleration duration, the magnitude of one of the adjusting acceleration torque and of the acceleration duration being kept constant or being made dependent on the amount of the adjustment angle (β) covered.

3. The method in accordance with claim 2, wherein by means of the adjusting device, a relative rotation in the direction of the maximum position is carried out, with the participation of one of the braking of one or more unbalanced-mass part-bodies of one type and the acceleration of one or more unbalanced-mass part-bodies of the other type, only in such one of two ways:

the relative rotation is begun when the minimum position is left and the relative-rotation is terminated by the maximum stop being reached; and, after the termination of the relative rotation, the maximum position is maintained, counter to the influence of restoring torques by the use of at least one of the following means:

as a result of the effect of reaction torques, by means of which, after the phase angle β=0° is exceeded in the direction of negative phase angles, the maximum stop is loaded in the direction of negative phase angles, as a result of the effect of a torque which is derived from a motor and which loads the stop member of one type of the maximum stop in the direction of negative phase angles, said motor being connected to at least one unbalanced-mass part-body of another type so as to transmit torque, as a result of the effect of a mechanically acting interlock, by means of which the unbalanced-mass part-bodies of one type and the other are fixed relative to one another in the position (E) of the phase angle.

4. The method in accordance with claim 3, wherein by means of the adjusting device, a) a minimum position, with a position β(A) of the phase angle, is set or maintained, as early as while the vibrator is leaving the position of rest, in the case of a rotary frequency lower than the working rotary frequency, by the use of at least one of the following means:

as a result of an interlock, switchable by means of auxiliary energy, of the relative position of the unbalanced-mass part-bodies of one type and the other, as a result of a dynamically produced minimum stop, at which minimum stop two stop members are brought into mutual contact with the transmission of contact force from one member to the other, due to the fact that, at least during the operation of starting up from a standstill, the torque serving for driving the unbalanced-mass part-bodies of one type is higher than the torque serving for driving the unbalanced-mass part-bodies of the other type, as a result of one of an electric and hydraulic circuit for influencing the rotational movements of the motors connected to unbalanced-mass part-bodies of one of the two types, during the starting of the rotation of the vibrator when the latter leaves the standstill situation, the one of an electric and hydraulic circuit bringing about a time-limited different generation of torque on the motors, or as a result of utilizing the effect whereby the vibrator automatically endeavors to maintain the minimum position, b) a minimum position is maintained, during the operation of stopping the vibrator from the working rotary frequency, by the use of at least one of the following means:

as a result of the braking of all the motors with an equal motor torque at least at the start of braking, as a result of the use of an interlock, switchable by means of auxiliary energy, of the relative position of the unbalanced-mass part-bodies of one type and the other in the minimum position, as a result of maintaining the contacting of the stop faces of a minimum stop, in that, during the operation of stopping the vibrator, the braking torque of the motor of the other type is higher than the braking torque of the motor of the one type, as a result of utilizing the effect whereby the vibrator automatically endeavors to maintain the minimum position.

5. The method in accordance with claim 4, wherein one or more motors are used both for transmitting drive power to the vibrator and for generating an adjusting braking torque or an adjusting acceleration torque, wherein the adjusting braking torque may take effect on one of the following:

on one type of unbalanced-mass part-bodies for the purpose of adjusting the phase angle from a minimum position to a maximum position; and, on the other type of unbalanced-mass part-bodies for the purpose of adjusting the phase angle from a maximum position to a minimum position, and the motors being selectively assigned one of the following functions:

the motor or motors are connected only to the one type of unbalanced-mass part-bodies, the motors are connected only to the one type of unbalanced-mass part-bodies and each pair of unbalanced-mass part bodies is assigned its own motor, at least one motor of the one type is connected to an unbalanced-mass part-body of the one type and at least one motor of the other type is connected to an unbalanced-mass part-body of the other type.

6. The adjusting device in accordance with claim 5, wherein the maximum position also comprises a phase angle in the range between β(E) equal to +90° and β(E) greater than or equal to 0° or in the range of negative values between β(E) lower than or equal to 0° and β(E) equal to −90°.

7. A method for operating an adjusting device for an unbalanced mass directional vibrator having at least two pairs of unbalanced-mass part-bodies and are driven to rotate about an associated axis having the vectorially summed centrifugal-force part-vectors form the resultant centrifugal-force vector, as a result of an action of said vectorially summed centrifugal-force part-vectors the mass of the vibrator being set in directed oscillations, a pair being formed by one unbalanced-mass part-body of a first type and one unbalanced-mass part-body of a second type, a phase angle β being adjustable by means of an adjusting device defined between the associated centrifugal-force part-vectors of the unbalanced-mass part-bodies of a pair during the rotation of the unbalanced-mass part-bodies, the drive being provided for at least one of rotating the unbalanced-mass part-bodies and adjusting the phase angle β using at least one motor of hydraulically operated motors for rotating the unbalanced-mass part-bodies and at least two motors of said hydraulically operated motors for adjusting the phase angle β in the range β=180° (β=180° corresponding to a zero amplitude) to β=90° or in the range β=180° to β=270°, wherein said at least two motors are connected in series and the phase angle β being adjusted by a relative rotation of the unbalanced-mass part-bodies of the first type relative to the unbalanced-mass part bodies of the second type, the adjusting energy required for adjustment being derived from the at least one hydraulically operated motor connected to unbalanced-mass part-bodies so as to transmit torque, there being carried out by means of the adjusting device an adjustment of the phase angle β from a minimum position, with a position β(A) of the phase angle in which the amplitudes of oscillation have a minimum, to a maximum position, with a position β(E) of the phase angle in which the amplitudes of oscillation have a maximum, wherein the adjustment of the phase angle β from a minimum position to a maximum position is carried out by one of three ways:

cutting in an adjusting braking torque acting on at least one of the unbalanced-mass part-bodies of the one type by modulation with an increased adjusting pressure at the outlet of the associated hydraulically operated motor, and, cutting in an adjusting acceleration torque acting on at least one of the unbalanced-mass part-bodies of the other type by modulation with an increased adjusting pressure at the inlet of the associated hydraulically operated motor; and, cutting in both the adjusting braking torque and the adjusting acceleration torque by modulation with an increased adjusting pressure at the outlet of one and at the inlet of the other of the associated hydraulically operated motors; and, when the maximum position is reached, the relative rotation is positively terminated by means of a mechanically acting stop, the stop being formed by two mutually contacting members, wherein one of the two mutually contacting members is connected in a torque-transmitting manner to at least one of the unbalanced-mass part-bodies of one type and the other is connected in a torque transmitting manner to at least one of the unbalanced-mass part-bodies of the other type; and wherein, by means of the adjusting device, a) a minimum position, with a position β(A) of the phase angle, is selected from being set and maintained, as early as while the vibrator is leaving the position of rest, in the case of a rotary frequency lower than the working rotary frequency, by the use of at least one of the following means:

as a result of an interlock, switchable by means of auxiliary energy, of the relative position of the unbalanced-mass part-bodies of one type and the other, as a result of a dynamically produced minimum stop, at which minimum stop two stop members are brought into mutual contact with the transmission of contact force from one member to the other, due to the fact that, at least during the operation of starting up from a standstill, the torque serving for driving the unbalanced-mass part-bodies of one type is higher than the torque serving for driving the unbalanced-mass part-bodies of the other type, as a result of a hydraulic circuit for influencing the rotational movements of the motors connected to unbalanced-mass part-bodies of one of the two types, during the starting of the rotation of the vibrator when the latter leaves the standstill situation, the hydraulic circuit bringing about a time-limited different generation of torque on the motors, or as a result of utilizing the effect whereby the vibrator automatically endeavors to maintain the minimum position, and b) a minimum position is maintained, during the operation of stopping the vibrator from the working rotary frequency, by the use of at least one of the following means:

as a result of the braking of all the motors with an equal motor torque at least at the start of braking, as a result of the use of an interlock, switchable by means of auxiliary energy, of the relative position of the unbalanced-mass part-bodies of one type and the other in the minimum position, as a result of maintaining the contacting of the stop faces of a minimum stop, in that, during the operation of stopping the vibrator, the braking torque of the motor of the other type is higher than the braking torque of the motor of the one type, as a result of modulation with an adjusting pressure taking effect at one of the outlet of one of the hydraulic motors and the inlet of the other hydraulic motor (M1), as a result of utilizing the effect whereby the vibrator automatically endeavors to maintain the minimum position.

8. The method in accordance with claim 7, wherein by means of the adjusting device, a) a relative rotation in the direction of the maximum position is carried out, with the participation one of the braking of one or more unbalanced-mass part-bodies of one type and of the acceleration of one or more unbalanced-mass part-bodies of the other type, only in such a way that the relative rotation is begun when the minimum position is left and the relative rotation is terminated by the maximum stop being reached, b) after the termination of the relative rotation, the maximum position is maintained, counter to the influence of restoring torques, by the use of at least one of the following means:

as a result of the effect of reaction torques after the phase angle β=0° is exceeded in the direction of negative phase angles, the maximum stop is loaded in the direction of negative phase angles, as a result of the effect of a torque derived from a motor and which loads the stop member of one type of the maximum stop in the direction of negative phase angles, said motor being connected to at least one unbalanced-mass part-body of another type so as to transmit torque, as a result of the effect of a mechanically acting interlock, by means of which the unbalanced-mass part-bodies of one type and the other are fixed relative to one another in the position β(E) of the phase angle.

9. The method in accordance with claim 8, wherein the adjustment of the phase angle β to a minimum position during the starting of the vibrator or from a minimum position to a maximum position, in the case of a set working rotary frequency, by cutting in at least one of the following an adjusting braking torque and an adjusting acceleration torque, using one or more hydraulic motors is brought about, by an adjusting braking torque being generated by cutting in or controlling the change in the flow cross section of a member through which the volume flow of at least one motor flows, the effect of at least one of the cut-in and controlled change in the flow cross section not being intended for setting a predeterminable phase angle β p capable of being assumed without action upon a stop, and the through-flow member being designed as one of the following a throttle and a motor, additionally present, of which the volume flow flowing through said one of the following is variable.

10. The method in accordance with claim 9, wherein the cutting in of an adjusting braking torque or the cutting in of an adjusting acceleration torque is carried out such that the magnitude of the adjusting braking torque or of the adjusting acceleration torque is changed from an initial magnitude to a final magnitude as a predeterminable function of a time or of another variable.

11. The method in accordance with claim 10, wherein an unbalanced-mass directional vibrator is used, in which the unbalanced-mass part-body of one type and the unbalanced-mass part-body of the other type of each pair are mounted with concentrically coinciding axes of rotation, preferably on a common shaft.

12. The method in accordance with claim 11, wherein unbalanced-mass part-bodies selected from one type and of the other type and belonging to different pairs, are positively synchronized by the use of gearing means.

13. The method in accordance with claim 12, wherein a rotating stop device having the following features is used:

the stop device is mounted rotatably as a whole about an axis and is equipped with two gearwheels rotatable about the axis, a torque-transmitting connection to the unbalanced-mass part-bodies of one type is made via one gearwheel and a torque-transmitting connection to the unbalanced-mass part-bodies of the other type is made via the other gearwheel, the stop device contains at least two stop members, said stop members being rotatable relative to one another and having one connected to one gearwheel and the other to the other gearwheel, at least two rotary-angle stop positions being capable of being produced as a result of the rotatability of the stop members, a minimum position is capable of being set by means of one rotary-angle stop position and a maximum position is capable of being set by means of the other rotary-angle stop position, the rotary stop angle of which is also capable of being made variable.

14. The method in accordance with claim 13, wherein by means of the adjusting device, different static moments are set by the use of at least one of the following feature combinations:

the vibrator is equipped with a first and a second double pair of unbalanced-mass part-bodies, the two pairs of each double pair being capable of being driven to rotate synchronously in opposite directions ($\omega 1$), and the minimum position and the maximum position for each double pair being capable of being set separately and differently, two different static moments being capable of being set in that, in one case, one double pair is set at a maximum position, while at the same time the other double pair is set at a minimum position, and in that, in the other case, both double pairs are set at a maximum position, the vibrator is equipped with a mechanical interlock, switchable by means of auxiliary energy, of the relative position of the unbalanced-mass part-bodies of one type and the other for fixing in different maximum positions, the mechanical interlock being used, when at least one of the maximum positions is assumed, with the function of a maximum stop being dispensed with, and different maximum positions being selected by manipulating at least one of the switching times for cutting in and cutting out the auxiliary energy, the vibrator is equipped with two different stops for two different maximum positions with two different phase angles $\beta$, said different maximum positions being capable of being set, with the direction of rotation of all the unbalanced-mass part-bodies being reversed.

15. The method in accordance with claim 14, wherein, three or more pairs of unbalanced-mass part-bodies are used, a vibrator equipped with three pairs being operated as a vertical vibrator with three pairs located one above the other.

* * * * *